US009694280B2

(12) United States Patent
Gordon et al.

(10) Patent No.: US 9,694,280 B2
(45) Date of Patent: Jul. 4, 2017

(54) SYSTEMS AND METHODS FOR PROVIDING CROSS PLATFORM ACCESS TO INTERACTIVE CONTENT

(71) Applicant: Sony Interactive Entertainment America LLC, San Mateo, CA (US)

(72) Inventors: Don Gordon, Los Gatos, CA (US); John Speck, San Francisco, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 466 days.

(21) Appl. No.: 14/135,019

(22) Filed: Dec. 19, 2013

(65) Prior Publication Data

US 2015/0141120 A1    May 21, 2015

Related U.S. Application Data

(60) Provisional application No. 61/904,707, filed on Nov. 15, 2013.

(51) Int. Cl.
| | |
|---|---|
| *A63F 9/24* | (2006.01) |
| *A63F 13/355* | (2014.01) |
| *H04L 29/08* | (2006.01) |
| *A63F 13/792* | (2014.01) |
| *A63F 13/73* | (2014.01) |

(52) U.S. Cl.
CPC ........... *A63F 13/355* (2014.09); *A63F 13/73* (2014.09); *A63F 13/792* (2014.09); *H04L 67/10* (2013.01)

(58) Field of Classification Search
None
See application file for complete search history.

(56) References Cited

U.S. PATENT DOCUMENTS

| | | | | |
|---|---|---|---|---|
| 8,066,572 | B1 * | 11/2011 | Timmons ................ | H04L 67/38 273/239 |
| 2004/0097288 | A1 * | 5/2004 | Sloate .................... | A63F 13/12 463/42 |
| 2007/0293319 | A1 * | 12/2007 | Stamper ................. | A63F 13/12 463/42 |
| 2008/0220859 | A1 * | 9/2008 | Haeuser ................. | A63F 13/12 463/29 |
| 2009/0298576 | A1 * | 12/2009 | Nguyen ................. | G07F 17/32 463/25 |
| 2010/0174593 | A1 * | 7/2010 | Cao ........................ | A63F 13/12 705/14.12 |
| 2011/0172007 | A1 * | 7/2011 | Sulyok ................... | A63F 13/12 463/29 |
| 2012/0004042 | A1 * | 1/2012 | Perry ..................... | A63F 13/30 463/42 |

(Continued)

*Primary Examiner* — Paul A D'Agostino
(74) *Attorney, Agent, or Firm* — Martine Penilla Group, LLP

(57) ABSTRACT

Systems, methods, and computer readable media for enabling cross platform access to a previously purchased product (PPP) are provided. Cross platform access to the PPP can be accomplished by using a datacenter capable of locally rendering content of the PPP and distributing the rendered content for consumption by a platform other than the platform for which the PPP was designed. This advantageously enables end users to use other platforms and experience the PPP in a manner that emulates or substantially replicates the same experience the user enjoys when interacting with the PPP on its designed platform.

16 Claims, 11 Drawing Sheets

(56) References Cited

U.S. PATENT DOCUMENTS

| | | | | |
|---|---|---|---|---|
| 2012/0108343 A1* | 5/2012 | Marsico | ............... | H04W 8/20 |
| | | | | 463/42 |
| 2013/0190072 A1* | 7/2013 | Nicholas | ............... | A63F 9/24 |
| | | | | 463/25 |
| 2014/0066209 A1* | 3/2014 | Annambhotla | ......... | A63F 13/12 |
| | | | | 463/42 |

* cited by examiner

SYSTEMS AND METHODS FOR PROVIDING CROSS PLATFORM ACCESS TO INTERACTIVE CONTENT

CROSS-REFERENCE TO RELATED APPLICATION

This application claims the benefit of U.S. Provisional Patent Application No. 61/904,707, filed Nov. 15, 2013, the disclosure of which is incorporated by reference herein in its entirety.

TECHNICAL FIELD

The present disclosure relates generally to the field of data processing systems that improve a users' ability to manipulate and access audio and video media across multiple platforms, and in particular, to accessing interactive video game content across multiple platforms.

BACKGROUND

Content can be presented on a variety of different devices, many of which may be owned by the same person. For example, some individuals or families may own relatively non-portable devices such as personal desktop computers or television and relatively portable devices such as laptop computers, tablets, and smartphones. In some situations, a user may initially be interacting with or viewing content on a relatively non-portable device, and then decide to leave. The same user may then desire to resume interacting with or view content using a relatively portable device. Accordingly, what are needed are systems and methods for enabling cross platform access to the same content.

SUMMARY

Systems and methods are provided for enabling cross platform access to media products. As defined herein, a product refers to any type of media that may be presented, played, and/or interacted with on a device. Such media may include interactive video games. The cross platform systems and methods enable continuity of game play and execution of a substantially similar gaming experience across platforms without compromising quality of game play. For example, the gaining experience may remain substantially the same even if the user transitions from a non-portable device to a portable device, and vice versa. Each product can include several components that enable, for example, a video game to be played on a platform. For example, the components can include executable product code (sometimes referred as binary code) and products (such as video or pictures).

Datacenter embodiments described herein enable this versatile gaming experience by using the same components of a product for each platform. For example, when a user purchases a product from a brick and mortar store or an online distributor, the components associated with that product can serve as the basis for rendering the previously purchased product (PPP) content for consumption on any platform. Thus, by using the same components, the user is presented with a contiguous gaming experience regardless of which platform he uses.

The datacenter can function as a cloud save center for various platforms and servers that communicate with the datacenter. This can permit a user to begin interacting with a product using a first platform, cease interacting with the first platform, and resume play of the product using a second platform at the same point he ceased using the first platform.

Various embodiments discussed herein protect the interest of product publishers by ensuring that the publishers are compensated for expanded use of its product with other platforms. For example, the publisher may be provided with a royalty payment for expanding usage of the product beyond its originally intended platform or service paradigm. The royalty can be based, for example, on a per platform basis or a per product basis. Other suitable payment metrics can be used to compensate the publisher and any other necessary entities for expanding usage of products to other platforms.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DETAILED DESCRIPTION

Systems, methods, and computer readable media for enabling cross platform access to a previously purchased product is provided and described with reference to FIGS. 1-12.

A previously purchased product (hereinafter "PPP") is defined herein as an executable product designed to be locally rendered, processed, and presented by a particular platform. The PPP may have its own SKU and cannot be locally rendered, processed, and presented by another platform. That other platform may require a separate PPP in order to locally render, process, and present that product.

The cross platform access to the PPP can be accomplished by using a datacenter capable of locally rendering content of the PPP and distributing the rendered content for consumption by a platform other than the platform for which the PPP was designed. This advantageously enables end users to use other platforms and experience the PPP in a manner that emulates or substantially replicates the same experience the user enjoys when interacting with the PPP on its designated platform.

For example, the datacenter enhances the gaming experience for users without cannibalizing publisher sales of those games. This can be accomplished by allowing a previously purchased video game designed for use with a first platform (e.g., a personal computer) to be rendered locally at the datacenter for distribution to and consumption on a second platform, or to any other suitable number of different platforms, in return for a fee paid to the publisher or other entity. This way, the publisher collects its fee for the original intended purpose of the video game (e.g., to play the game on a personal computer) as well as for subsequent uses of that game (e.g., to play the game on a tablet, smartphone, or other platform).

Figure 1:
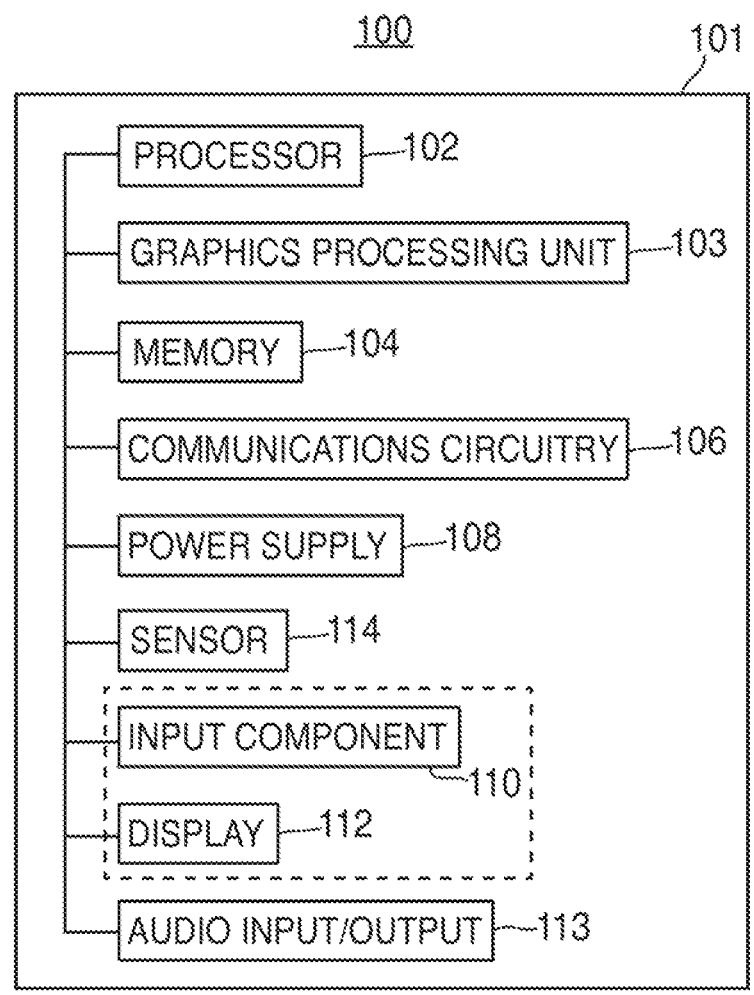
FIG. 1 is a schematic view of an illustrative electronic device according to an embodiment.

FIG. 1 is a schematic view of an illustrative electronic device 100. Electronic device 100 may be any portable, mobile, or hand-held electronic device that can operate wherever the user travels. Alternatively, electronic device 100 may not be portable at all, but may instead be generally stationary. Electronic device 100 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone smart phone, other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to presented product content rendered at the datacenter and for processing inputs to control aspects of the product content presented on the device) and, in other embodiments, electronic device 100 may perform multiple functions (e.g., a device that locally renders product content for presentation, plays music, and receives and transmits telephone calls).

First electronic device 100 may include a processor or control circuitry 102, graphics processing unit 103, memory 104, communications circuitry 106, power supply 108, input component 110, display 112, audio input/output 113, and sensor 114. Electronic device 100 may also include a bus 116 that may provide one or more wired or wireless communications links or paths for transferring data and/or power to, from, or between various other components of electronic device 100. In some embodiments, one or more components of electronic device 100 may be combined or omitted. Moreover, first electronic device 100 may include other components not combined or included in FIG. 1 and/or several instances of the components shown in FIG. 1. For the sake of simplicity, only one of each of the components of electronic device 100 is shown in FIG. 1.

Memory 104 of electronic device 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on electronic device 100), firmware, preference information (e.g., media playback preferences), transaction information (e.g., information such as credit card information), wireless connection information (e.g., information that may first electronic device 100 to establish a wireless connection), subscription information (e.g., information that keeps track of gaming services or other media a user subscribes to), contact information (e.g., telephone numbers and e-mail addresses), calendar information, any other suitable data, or any combination thereof.

Communications circuitry 106 of electronic device 100 may be provided to allow electronic device 100 to communicate with one or more other electronic devices, datacenters, or servers using any suitable communications protocol. For example, communications circuitry 106 may support Wi-Fi (e.g., an 802.11 protocol), Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any other communications protocol, or any combination thereof. Communications circuitry 106 may also include circuitry that can enable electronic device 100 to be electrically coupled to another device (e.g., a game controller or an accessory device) and communicate with that other device, either wirelessly or via a wired connection.

Power supply 108 of electronic device 100 may provide power to one or more of the components of electronic device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a smartphone). As another example, power supply 108 can be configured to generate power from a natural source (e.g., solar power using solar cells).

One or more input components 110 of electronic device 100 may be provided to permit a user to interact or interface with first electronic device 100. For example, input component 110 can take a variety of forms, including, but not limited to, a touch pad, dial, control pad, touch screen, one or more buttons (e.g., a keyboard), mouse, joy stick, track ball, microphone, camera, proximity sensor, light detector, and combinations thereof. Each input component 110 can be configured to provide one or more dedicated control functions for making selections or issuing commands associated with operating electronic device 100.

Electronic device 100 may also include one or more output components that may present information (e.g., graphical, audible, and/or tactile information) to a user of first electronic device 100. An output component of electronic device 100 may take various forms, including, but not limited to, audio speakers, headphones, audio line-outs, visual displays, antennas, infrared ports, rumblers, vibrators, or combinations thereof.

For example, as shown in FIG. 1, electronic device 100 may include display 112 as an output component. Display 112 may include any suitable type of display or interface for presenting visual data to a user. In some embodiments, display 112 may include a display embedded in electronic device 100 or coupled to electronic device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from first electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., product content, application screens for applications implemented on first electronic device, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 110, display 112, audio input/output 113 as I/O component or I/O interface 111). For example, input component 110 and display 112 may sometimes be a single I/O component 111, such as a touch screen, that may receive input information through a user's touch of a display screen and that may also provide visual information to a user via that same display screen.

Audio input/output 113 of electronic device 100 may include any suitable audio codec to outputting audio signals to a speaker and for receiving audio signals from a microphone. In some embodiments, audio 113 may only output audio signals, and in other embodiments, it may only receive audio signals.

Sensor 114 of electronic device 100 may include any suitable motion sensor operative to detect movements of first electronic device 100. For example, sensor 114 may be a motion-sensing component operative to detect movement of first electronic device 100. In some embodiments, sensor 114 may include one or more three-axis acceleration motion sensors (e.g., an accelerometer) operative to detect linear acceleration in three directions (i.e., the x- or left/right direction, the y- or up/down direction, and the z- or forward/backward direction). As another example, sensor 114 may include one or more single-axis or two-axis acceleration motion sensors which may be operative to detect linear acceleration only along each of the x- or left/right direction and the y- or up/down direction, or along any other pair of directions. In some embodiments, sensor 114 may include an electrostatic capacitance (e.g., capacitance-coupling) accelerometer that is based on silicon micro-machined micro electro-mechanical systems ("MEMS") technology, including a heat-based MEMS type accelerometer, a piezoelectric type accelerometer, a piezo-resistance type accelerometer, or any other suitable accelerometer.

In some embodiments, sensor 114 may be operative to directly or indirectly detect rotation, rotational movement, angular displacement, tilt, position, orientation, motion along a non-linear (e.g., arcuate) path, or any other non-linear motions. In some embodiments, sensor 114 may alternatively or additionally include one or more gyro-motion sensors or gyroscopes for detecting rotational movement. For example, sensor 114 may include a rotating or vibrating element. Using sensor 114, first electronic device 100 can determine an orientation of display 112, for example.

Processor 102 of electronic device 100 may include any processing circuitry operative to control the operations and performance of one or more components of first electronic device 100. For example, processor 102 may receive input signals from input component 110 and/or drive output signals through display 112. In some embodiments, as shown in FIG. 1, processor 102 may be used to run software 117. Software 117 may include, but is not limited to, an operating system, one or more operating system applications, firmware applications, media playback applications, media editing applications, or any other suitable applications. For example, processor 102 may load software 117 as a user interface program to determine how instructions or data received via an input component 110 or other component of device 100 may manipulate the way in which information is stored and/or provided to the user via an output component (e.g., display 112). Software 117 may be accessed by processor 102 from any suitable source, such as from memory 104 (e.g., via bus 116), or from any other suitable source. Electronic device 100 (e.g., processor 102, memory 104, or any other components available to device 100) may be configured to process graphical data at various resolutions, frequencies, intensities, and various other characteristics as may be appropriate for the capabilities and resources of first electronic device 100.

Electronic device 100 may also be provided with a housing 101 that may at least partially enclose one or more of the components of first electronic device 100 for protection from debris and other degrading forces external to device 100. In some embodiments, one or more of the components of first electronic device 100 may be provided within its own housing (e.g., input component 110 may be an independent keyboard or mouse within its own housing that may wirelessly or through a wire communicate with processor 102, which may be provided within its own housing).

Electronic device 100 can be a generic representation the hardware and software of a particular platform or client device. Each platform is different. The differences can be characterized by hardware configurations, software configurations, and ability to locally render a product. As defined herein, locally rendered refers to a device that performs graphical and computational rendering of content by processing components (e.g., program code) of a product. For example, at least processor 102 and graphics processing unit 103 of any platform may be used to render content using components of an product.

There may be many instances of one particular platform, each of which is capable of locally rendering a first product, but instances of all other platforms cannot locally render that first product. For example, personal computers and laptop computers running a first operating system may represent a first platform and personal and laptop computers running a second operating system may represent a second platform. A portable device such as a tablet running a third operating system may represent a third platform, and a portable device such as a smartphone may represent a fourth platform.

Each of these four different platforms may require components (e.g., program code) specifically designed for its platform in order to locally render the product, including product having the same title. Although products/product can have the same title, each of their respective components (e.g., program code or binary code) are different. That is, their respective components are designed to work on one particular platform and no others. Product publishers address this issue by providing multiple skus of the same titled product. Product publishers address this issue by providing multiple SKUs of the same titled product. Thus, if a user wishes to play the same titled product, for example, on a first platform (e.g., personal computer) and a second platform (e.g., smartphone), that user would have to procure a first product for the first platform and procure a second product for the second platform. Procurement of products can include installing a computer readable medium (e.g., CD) that contains the program code or downloading the program code from the Internet.

Platforms that locally render an product are referred to herein as thick client platforms, or thick clients. Thick client platforms may use processor 102, graphics processing unit 103, and other components contained therein to render product content that is provided to display 112. In some embodiments, thick client platforms may have program code corresponding to the product permanently stored within memory 104. The thick client platform may access the program code in memory 104 when rendering content. For example, an product can be downloaded from an online distributor and permanently stored in memory 104. In other embodiments, the thick client platform may receive program code from a remote source, for example, via the Internet, and temporarily stored in memory 104. For example, the product may be a web browser game that is temporarily stored in memory 104 and accessed to render product content.

Platforms that do not locally render a product but present product content and/or enable a user to interact with the product content are referred to herein as thin client platforms, or thin clients. Thin client platforms can receive rendered product content from a datacenter according to embodiments discussed herein and present the received rendered content to users of the platform. For example, a thin client may receive rendered product content via communications circuitry 106 and provide video to display 112 and audio to audio input/output 113, thereby eliminating the need to use processor 102 and/or graphics processing unit 103. The thin client platform can transmit input commands received by input component 110 to the datacenter via communications circuitry 106.

It should be understood that some platforms can function as either a thick client or a thin client depending on how it is presenting an product. For example, a platform may enable a user to play a video game that is locally rendered (in which case the platform may function as a thick client) and that same platform may enable a user to play a video game that is rendered at a datacenter (in which case the platform may function as a thin client).

Figure 2:
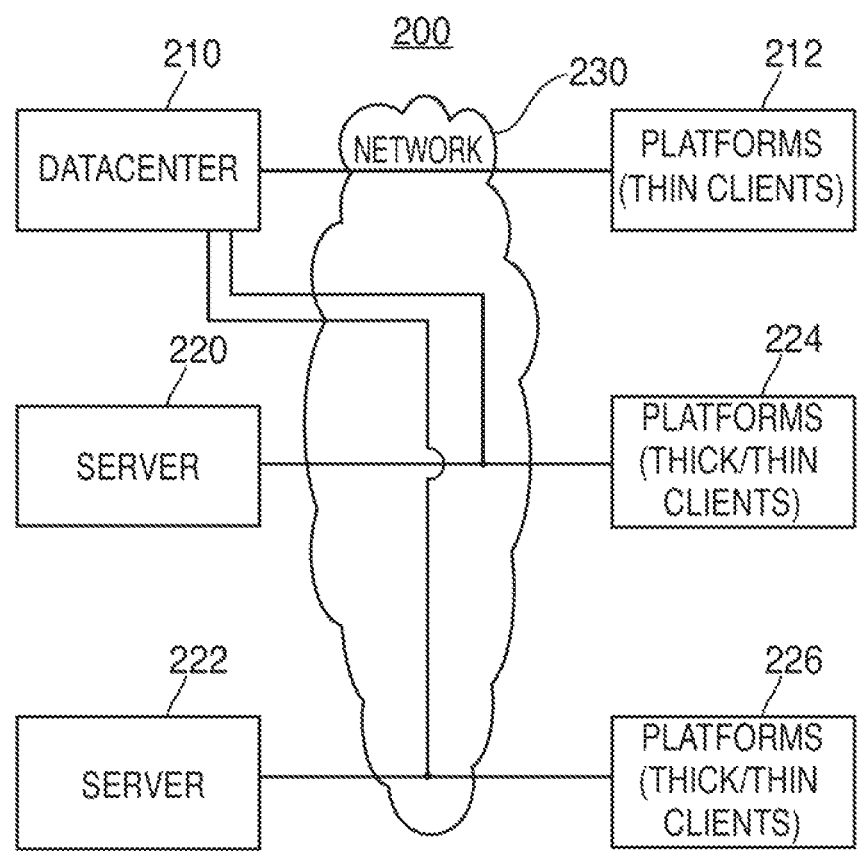
FIG. 2 shows an illustrative diagram of a system according to an embodiment.

FIG. 2 shows an illustrative diagram of system 200 according to an embodiment. System 200 can include datacenter 210, thin clients 212, servers 220 and 222, thick clients 224 and 226, and network 230. It is understood that the number of components shown are merely illustrative and that any suitable number of such components may comprise system 200. As shown, datacenter 210 may communicate with platforms 212, servers 220 and 222, and platforms 224 and 226 via network 230. Server 220 may communicate with thick clients 224 via network 224, and server 222 may communicate with thick clients 226. Platforms 212 may be operative to receive rendered content from database 210 and may function solely as thin clients. Platforms 224 and 226 may function as thick clients or thin clients depending on how they are presenting an product. For example, when platform 224 is receiving rendered product content from database 210, it may function as a thin client, when platform 224 is locally rendering product content, it may function as a thick client.

Network 230 can be any suitable network that permits flow of data to and from datacenter 210, platforms 212, servers 220 and 222, platforms 224 and 226. Any suitable circuitry, device, system or combination of these (e.g., a wireless communications infrastructure including one or more communications towers, telecommunications servers, or the like) operative to create a communications network may be used to provide network 230. Network 230 may be capable of providing communications using any suitable communications protocol. For example, network 230 may support Wi-Fi, Ethernet, Bluetooth™, BLE, high frequency systems (e.g., 900 MHz, 2.4 GHz, and 5.6 GHz communication systems), infrared, TCP/IP, HTTP, BitTorrent™, FTP, RTP, RTSP, SSH, any communications protocol that may be used by wireless and cellular telephones and personal e-mail devices (e.g., GSM, GSM plus EDGE, CDMA, OFDMA, HSPA, multi-band, etc.), any other communications protocol, or any combination thereof. Network 230 can be a public network such as the Internet or a wide area network. Public networks are generally considered as unsecured networks that are susceptible to hacking, variance in available bandwidth, and reliability. Private, walled off, or secured networks are also susceptible to the same issues as unsecured networks, but to a lesser degree.

Datacenter 210 can provide several services according to various embodiments. In one embodiment, datacenter 210 can render content of products, including previously purchased products, and distribute the rendered content to one or more of platforms 212, 224, and 226 via network 230. That is, datacenter 210 may serve as the content rendering engine for any product that a user interacts with using, for example, one of platforms 212. In this context, a user may view and interact with an product (e.g., a video game) using one of platforms 212, but the computational rendering of content presented on platform 212 is performed remote to platform 212. This approach can relieve computational burden on platform 212, thereby enabling it to employ fewer hardware resources that would otherwise be needed to fully execute the product itself. It can also help alleviate the need for users to upgrade their equipment. In some embodiments, this can also enable platform 212 to be relatively more portable.

In another embodiment, datacenter 210 can provide cross platform access to a PPP. Thus, once it is verified that a user has previously purchased an product, the PPP, datacenter 210 can locally render content of that PPP and distribute the rendered content for consumption by a platform other than the platform for which the PPP was designed.

In yet another embodiment, datacenter 210 can manage cross platform product sessions by saving a user position within an product. This enables a user to cease playing an product on a first platform, and then resume playing that same product on a second platform from the same location the user ceased playing the product on the first platform.

Figure 3:
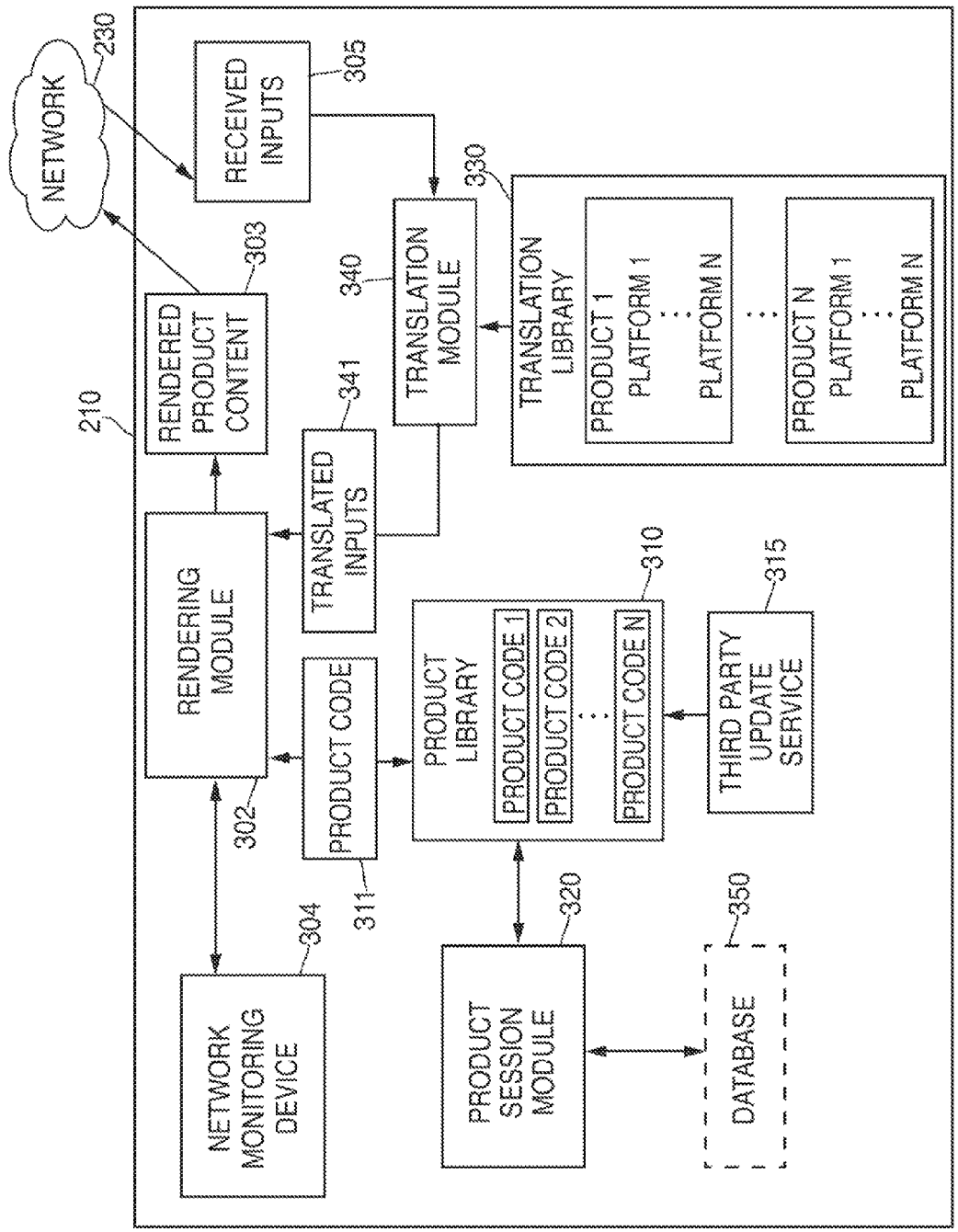
FIG. 3 shows more detailed illustrative schematic of a datacenter according to an embodiment.

Referring now to FIG. 3, a more detailed illustrative schematic of datacenter 210 is shown according to an embodiment. As shown, datacenter 210 can include rendering module 302, network monitoring module 304, product library 310, third party update service 315, product session module 320, translation library 330, translation module 340, and optional database 350. Each of the components can be implemented as part of one or more servers.

Rendering module 302 may be operative to render product content for distribution as rendered product content 303 based on product code 311 and translated inputs 341. As shown, rendered product content 303 is provided to network 230 for distribution to a platform (not shown) operating as a thin client. Although not specifically shown in FIG. 3, rendering module 302 may be provided with all necessary components of any product. Product code 311 and other components (not shown) can be provided by product library 310. In some embodiments, product code 311 can embody the same binary code of a PPP. Product library 310 may maintain component equivalents (e.g., including binary codes and assets) of all purchasable products, as shown by product codes 1 through N. The product codes can include different platform specific product codes for the same title. For example, product code 1 may embody the binary code of an product designed to be locally rendered on a first platform, and product code 2 may embody the binary code of an product designed to be locally rendered on a second platform, and so on. Library 310 has been limited to showing only product codes to avoid overcrowding the drawing, but is understood that components associated with each code could have been shown. Library 310 can be updated as new products are made available.

Third party update service 315 may be operative to update products stored in library 310 or provide new products for storage therein. Update service 315 may access network 230 for retrieving product updates and new products. For example, update service 315 may cause one or more components of a product to be updated when a new version and/or addition is available. As another example, update service 315 may cause components of products to be stored in library 310 in response to a purchase event of that product or in response to a new release of that product.

Rendering module 302 can render product code 311 in the same manner a platform would render the PPP. For example, if the PPP is designed to be locally generated on a first platform, rendering module 302 can render the product code as if it were the first platform. In some embodiments, rendering module 302 may be the functional equivalent to the platform for which the PPP's components were designed.

Product session module 320 may be operative to monitor, save, and/or report the state of an product session. An product session can refer to a user's start and end time of interacting with an product, and can represent all attributes of the user's advancement within an product. In some embodiments, module 320 can keep track of user's progress within an product. This is sometimes referred to as a save feature. The save data may be stored in database 350 or it may be provided to a database remote to datacenter 210, such as a database associated with server 220. In other embodiments, product session module 320 can enable a user to resume a game in a different platform. Thus, if a user ceases playing a game on a first platform, and begins playing the same game on another platform, product session module 320 can ensure that the user resumes play where he left off.

Translation module 340 may be operative to map received inputs 305 to translated inputs 341. Received inputs 305 may be inputs generated by and transmitted by a platform receiving rendered product content 303. Received inputs 305 can be input commands input by the user when interacting with rendered product content 303 using his platform. Because the platform being used to generate received inputs 305 may be different than the platform for which product code 311 was originally designed for, translation module 340 may be needed to map the received inputs to a format that can be recognized and used by rendering module 302. Translation module 340 may access the appropriate translation map in translation library 330 to perform the appropriate mapping.

Translation library 330 may include any suitable number of translation maps necessary to produce the appropriate translated inputs 341 for rendering module 302. In some embodiments, several translation maps may be associated with each product, where each map is able to appropriately translate the received input command from any platform to the platform designated by the product. For example, assume product 1 designates or was designed to be locally rendered on a first platform. The translation maps associated with product can map inputs from any other platform to first platform inputs.

Network monitoring module 304 may monitor characteristics associated with network 230 and other factors that may affect end user experience with rendered product content 303. The factors can include latency of the connection existing between datacenter 210 and platforms, characteristics of platforms (e.g., processing power and whether a wired or wireless connection is being utilized), and characteristics of network 230 (e.g., dropout rate, bandwidth, etc.). Using information from module 304, datacenter 210 can adaptively adjust a bit rate of rendered product content 303 to ensure end users are provided with a minimum quality of service when viewing and/or interacting with the product.

Additional details on how datacenter 210 how rendering module 302 generates rendered product content 303 and distribute the rendered content according to a dynamic bit rate can be found in commonly owned U.S. Pat. No. 7,849,491 and U.S. Patent Publication No. 20090118019, both disclosures of which are incorporated by reference herein in their entireties.

Referring back to FIG. 2, servers 220 and 222 can represent different entities or third parties that provide digital distribution and digital rights management of products separately from any service provided by datacenter 220. Servers 220 and 222 can enable "online" features to users who purchase products. The online features can include digital rights management, electronic downloading of products for storage on a user's platform, social media functionality, type written and/or voice chat features, and access to an online store to purchase additional products. In order to access these online services, user may be required to download a third party integration client program onto each platform he wishes to use in connection with the online services. The client program contained in the platform may communicate with a third party integration host program running on a server to enable the online services. For example, the host and client programs may communicate with each other to verify digital rights prior to enabling user access to the product. Platforms 224 and 226 can differ in that they have accounts setup for respective servers 220 and 222. That is, each of platforms 224 can have a client program stored therein for communicating with server 220 via network 220, and each of platforms 226 can have stored therein a client program that communicates with server 222. In some embodiments, servers 220 and 222 can be similar in some respects to some of the products or services provided by Steam™, of Valve Corporation, and uPlay™, of Ubisoft Entertainment, and Origin™, of Electronic Arts, Inc.

Figure 4:
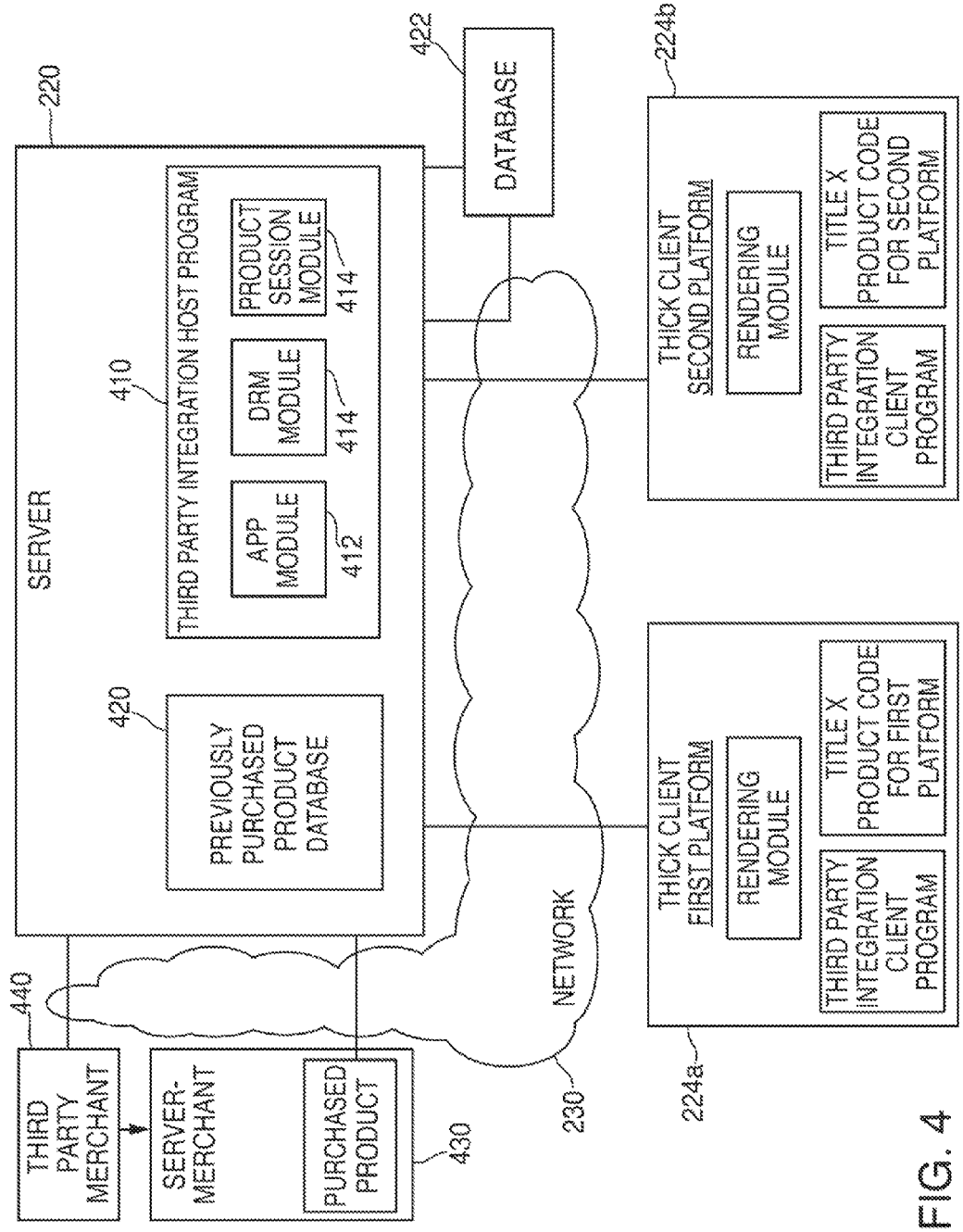
FIG. 4 shows a more detailed illustrative schematic of a system using a third party server according to an embodiment.

Referring now to FIG. 4, a more detailed illustrative schematic of server 220 and platforms 224 are shown according to an embodiment. As shown, server 220 can include third part integration host program 410 and previously purchased product database 420. Host program 410 may provide online services and digital rights management to platforms 224a and 224b. In some embodiments, host program 410 may serve as a host, whereas client programs running on platforms 224a and 224b may serve as clients. Host program 410 can include APPS module 412, DRM module 414, and product session module 416. APPS module 412 may include online features that users of platforms 224a and 224b can use when interacting with an product being locally rendered therein. DRM module 414 may manage digital rights of products stored on platforms 224a and 224b. Product session module 416 may be similar in many respects to product session module 320 of FIG. 3. For example, module 416 can track a user's progress in a game and save that progress in a database 422. Database 422 may be maintained external to or within server 220.

Server 220 may enable users to download products to platforms affiliated with the server. For example, server 220 may enable a user to download an product to first platform 224a and another product to second platform 224b, where platforms 224a and 224b are different platforms. In this example, the downloaded products can be video games having the same title (e.g., Title X) but each has an product code is designed for its respective platform. Since multiple skus of the same titled product may need to be downloaded for different platforms, this can result a costly procurement of products. Servers 220 and 222 can mitigate the cost by providing access to multiple skus when the user enters into an agreement with its online server. For example, if a user purchases a video game for one particular platform, the proprietary service may enable the user to download that video game for another platform. As another example, the user may pay a subscription fee to gain access to multiple skus of the same title.

Products can be downloaded from server 220's propriety online store, which may be run by server merchant 430. When an product is purchased, this information may be updated in previously purchased product database 420. Alternatively, products can be downloaded from third party digital distributors such as third party merchant 440. Third party merchants 440 may require the user to select an online service such as that provided by server 220 or 222 in order to access the product. Products purchased from third party merchant 440 may also be stored in previously purchased product database.

Although users can purchase multiple SKUs of the same titled product or use services such as those provided by servers 220 and 222, these approaches can suffer from one or more issues. Purchasing multiple SKUs of the same title can be prohibitively expensive. Another issue is that the gaming experience for the same titled product can be considerably different across platforms. For example, the gaming experience for an product on a personal computer can be quite different than the gaming experience for the same titled product on a smartphone device. The personal computer product can appear to be "fully loaded", whereas the smartphone device product can appear to be "dumbed down" in comparison. This can leave the user of the smartphone product underwhelmed. Another issue is that users are effectively handcuffed to one platform type and cannot switch to another platform and resume play of the same product. The user may not be able to maintain contiguous game play from one platform to another because both platforms are running different SKUs.

Figure 5:
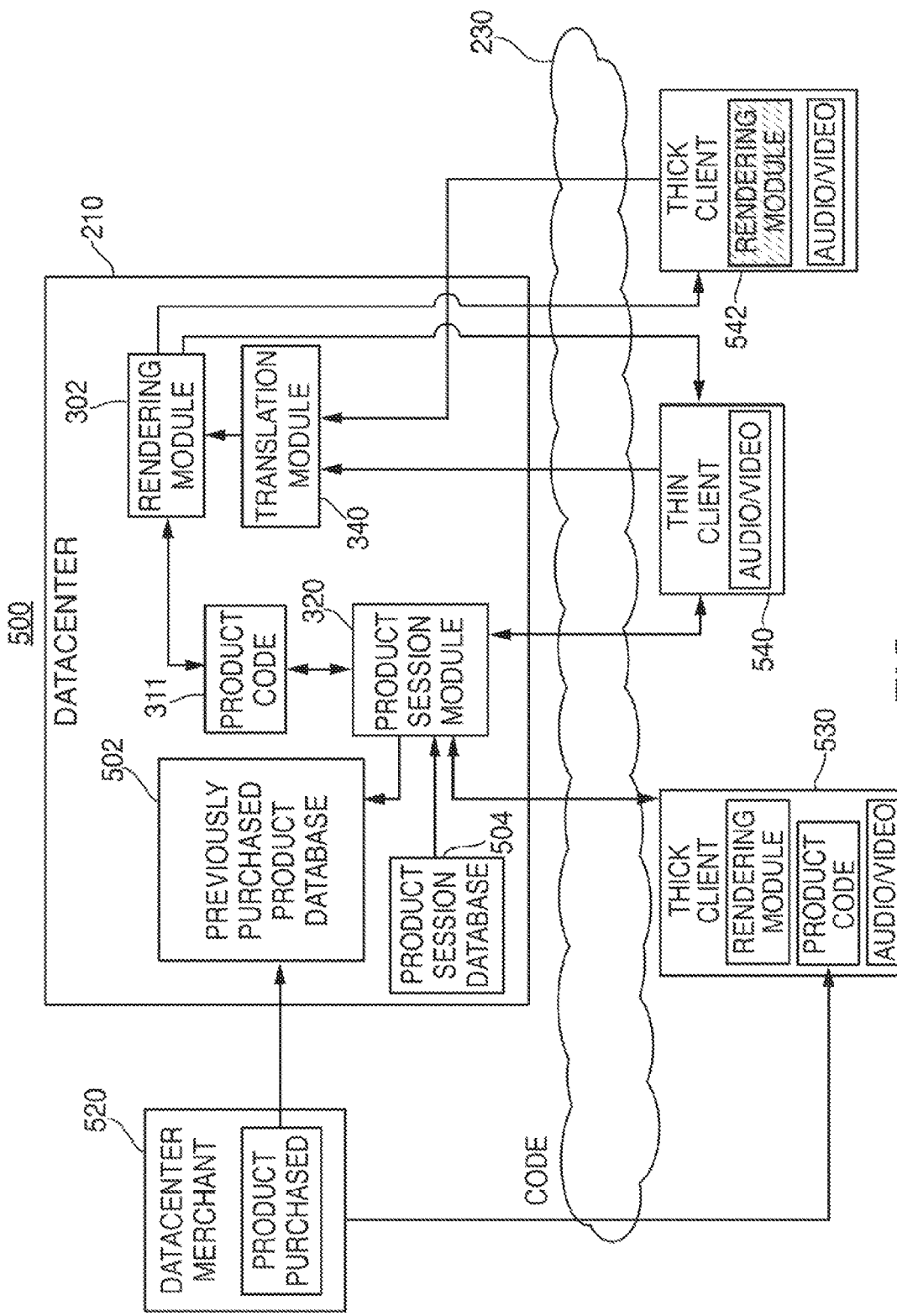
FIG. 5 shows an illustrative arrangement in which a datacenter provides rendered content pertaining to a previously purchased product to one or more thin clients, according to an embodiment.

FIG. 5 shows an illustrative arrangement 500 in which a datacenter provides rendered content pertaining to a PPP to one or more thin clients, according to an embodiment. Illustrative arrangement 500 may represent scenarios where datacenter 500 operates independent of any third parties that provide online services such as those provided by servers 220 and 220. Many of the components shown in FIG. 3 are duplicates of the same components of FIG. 3. New components include previously purchased product database 502, product session database 504, datacenter merchant 520, platform 530, platform 540, and platform 542. Previously purchased product database 502 may be similar to previously purchased product database 420 of FIG. 4 in that it can manage user accounts by keeping track of which products the user has previously purchased. In some embodiments, when users purchase products from datacenter merchant 520, this purchase information may be transmitted to and stored in database 502. Product session database 504 may manage product session information similar to the manner in which database 422 stores product session information. In other words, database 504 may store data necessary to enable a user to resume playback of a PPP on any platform.

Platform 530 may represent a thick client platform that locally renders product code of a first PPP. FIG. 5 illustrates that the product code of the PPP was downloaded from datacenter merchant 520. Platforms 540 and 542 may represent thin client platforms that present rendered content received from database 520.

Figure 6:
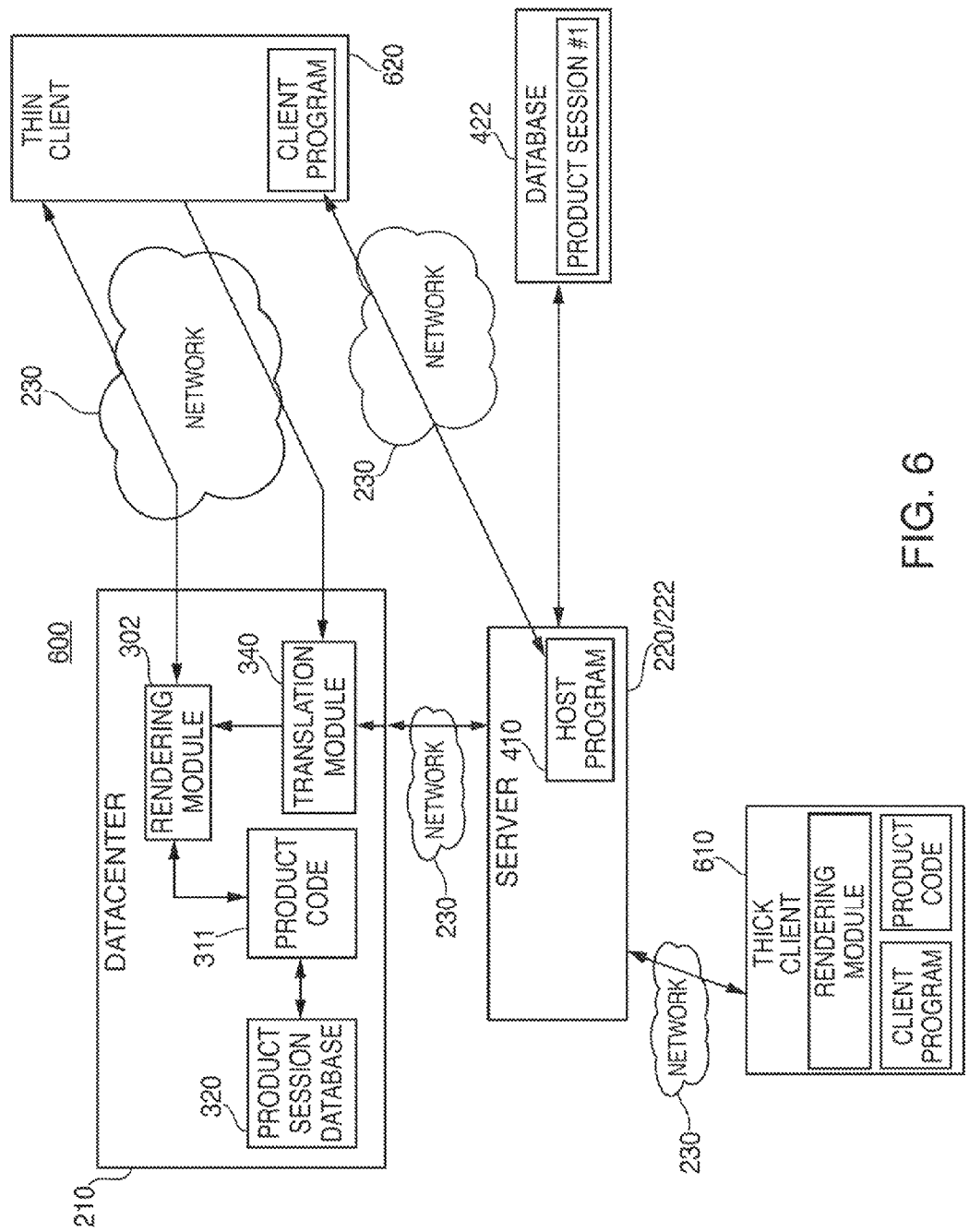
FIG. 6 shows an illustrative arrangement in which a datacenter provides a rendering service that complements online services provided by third parties, according to an embodiment.

FIG. 6 shows an illustrative arrangement 600 in which a datacenter provides a PPP rendering service that compliments online services provided by third parties, according to an embodiment. Illustrative arrangement 600 may represent scenarios where datacenter 600 enables third parties (which operate servers 220 and 222) to provide rendered content for one or more PPPs to users affiliated with the third parties. Datacenter 600 can provide this complimentary service in a manner that appears seamless to the end user. That is, the end user will think the rendered content service is being provided by the third party and not datacenter 210. Architecture 600 may include many of the same elements included in FIGS. 3 and 4. Platform 610 may represent a platform operating as a thick client and platform 620 may represent a platform operating as a thin client. Platforms 610 and 620 may both be affiliated with an online service provided by server 220/222. This is illustrated by the presence of the server program on both platforms 610 and 620.

Figure 7:
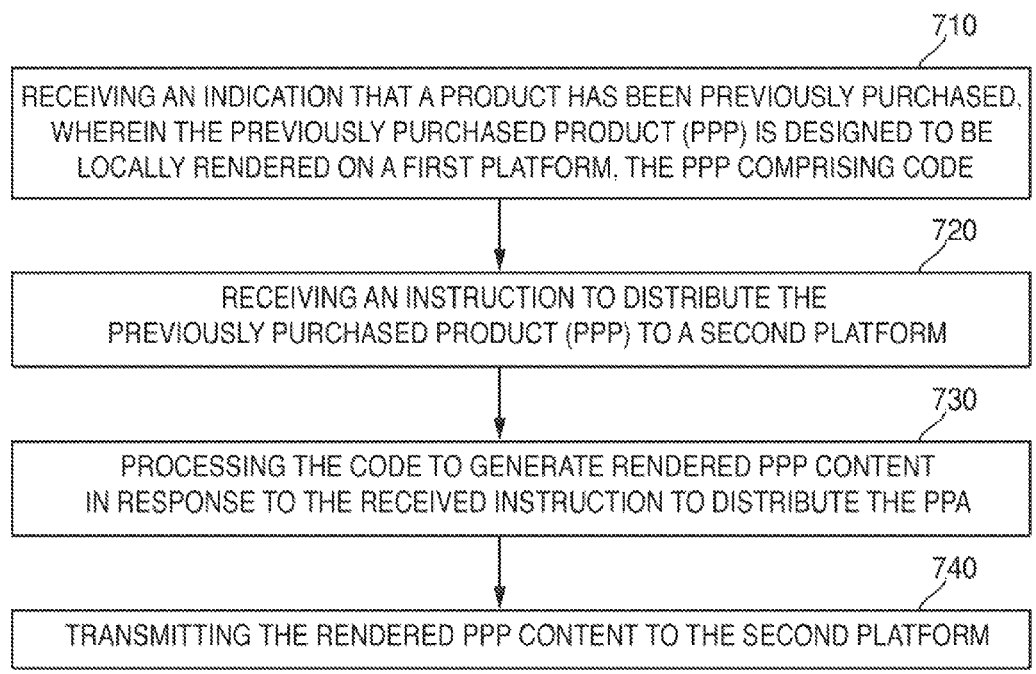
FIG. 7 shows an illustrative flowchart of steps for providing rendering services according to an embodiment.

FIG. 7 shows an illustrative flowchart of steps for providing PPP rendering services according to an embodiment. The steps of FIG. 7 may be implemented in connection with the system architectures of FIGS. 5 and 6, but is not limited as such. Beginning with step 610, an indication can be received (e.g., at datacenter 210) that an product has been previously purchased. The product can be a previously purchased product ("PPP") designed for use with a first platform (e.g., platform 530 or platform 610) and the PPP can include product code. For example, datacenter 210 can receive an indication that an product has been previously purchased in any number of suitable ways. In some embodiments, datacenter 210 may maintain a database of products purchased (e.g., database 502) through an online store (e.g., datacenter merchant 520) managed by datacenter 210. In other embodiments, datacenter 210 may receive periodic or on-demand notifications from servers 220 and 222 that specify which products have been previously purchased by a user. These received notifications may be stored in one or more databases contained within datacenter 210. These databases may be maintained for each user account. In yet another embodiment, datacenter 210 may not maintain databases that keep track of which products have been previously purchased by a user. In this embodiment, other parties such as servers 220 and 222 may keep track of which products have been previously purchased by a user (e.g., and store it in database 420) and transmit this information to datacenter 210 at an appropriate time. For example, server 220 may transmit such information to datacenter 210 in connection with a request to initiate a PPP rendering session on another platform.

At step 720, an instruction to distribute a datacenter rendered version of the PPP to a second platform can be received, and the PPP cannot be locally rendered on the second platform. This instruction can be received from a variety of different sources, including, for example, servers 220 or 222, platforms 530, 540, 542, 610, and 620. For example, in the context of architecture 500, a user may request a PPP rendering session on platform 540. This request may be transmitted from platform 540 to datacenter 210, which processes the request, and begins transmitting PPP rendered content to platform 540. For example, in the context of architecture 600, a user may request a PPP rendering session on platform 620. This request may be transmitted from platform 620 (using the client server program) to server 220 (using the host server program) via network 230. Server 220 may then instruct datacenter 210 to provide the PPP rendered content to platform 620.

At step 730, datacenter 210 may render content using the code of the PPP in response to the received instruction. For example, rendering module 302 may process product code 311 of the PPP to generated rendered PPP content for distribution to a platform. As discussed above, using the code of the PPP to render content for distribution to another platform ensures that the user is provided with substantially the same gaining experience as he has on the first platform. The user input interface on the second platform may be different than the user input interface on the first platform, but the game itself is effectively identical.

At step 740, the rendered PPP content is transmitted to the second platform. For example, datacenter 210 can transmit the rendered PPP content to one of platforms 540, 542, or 620. In some embodiments, datacenter 210 can dynamically adjust a bit rate of the rendered content based on various characteristics of the network connection connecting datacenter 210 to the platform receiving the rendered content. For example, if the network connection has a speed characteristic that exceeds a first threshold, the bit rate may be adjusted so that relatively high resolution content is rendered and transmitted. If the speed characteristic exceeds a second threshold, but not the first threshold, the bit rate may be adjusted so that relatively low resolution content is rendered and transmitted.

Datacenter 210 may receive input commands (e.g., control pad commands) from the platform receiving the rendered content via network 230 at step 750. The received inputs may be translated by translation module 340 into a format commensurate with the PPP being rendered by rendering module 302 so that rendering module 302 can process the translated inputs and render PPP content appropriately in response thereto.

The steps shown in FIG. 7 are merely illustrative, and it is understood that the order of the steps may be changed, that steps may be omitted, and other steps may be added. For example, step 710 may be removed and a new step may be added that verifies whether an product has been previously purchased before commencing content rendering for the second platform.

Figure 8:
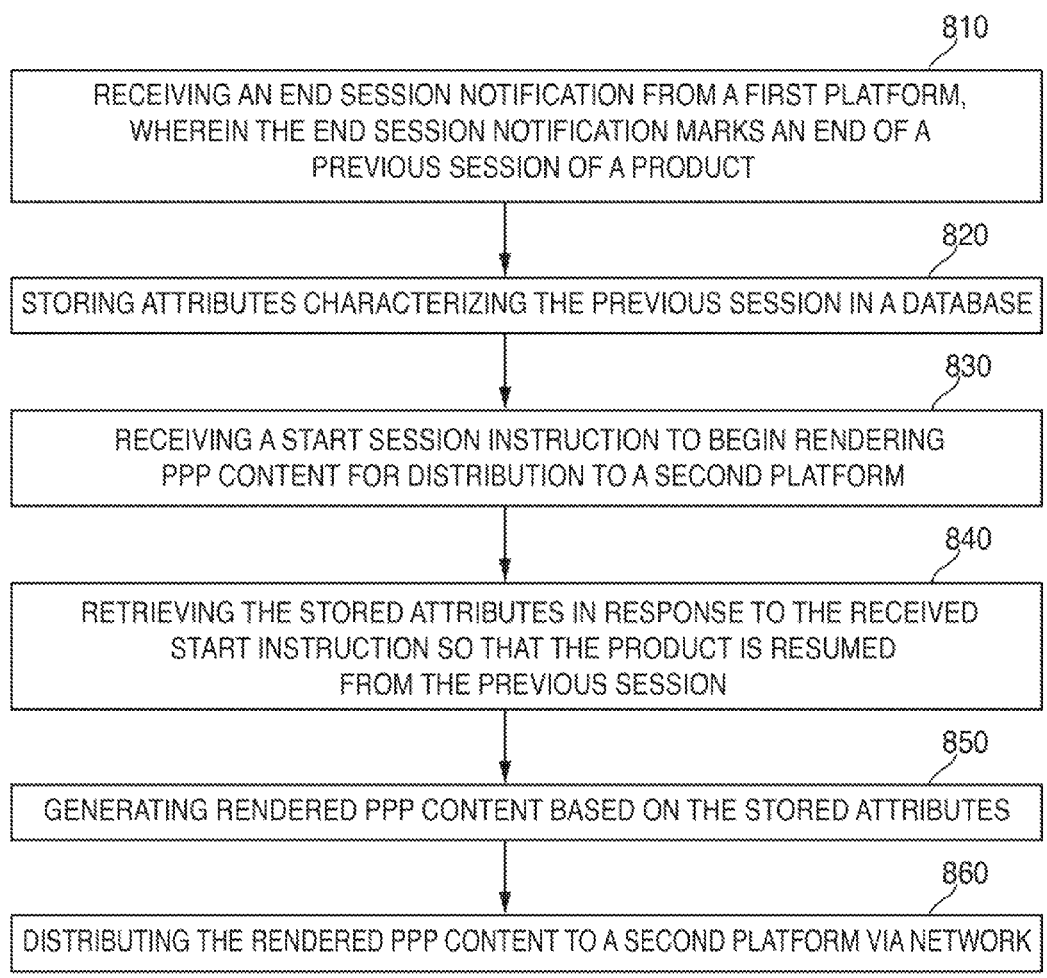
FIG. 8 shows an illustrative flowchart of steps that may be practiced by a datacenter to provide cross platform resumption of a previously purchased product, according to an embodiment.

FIG. 8 shows an illustrative flowchart of steps that may be practiced by a datacenter to provide cross platform resumption of a PPP according to an embodiment. Beginning with step 810, an end session notification can be received from a first platform. For example, the user may be using any one of platforms 530, 540, and 542 when he decides to stop playing a particular product. At step 820, attributes characterizing the user's position with the product can be stored in product session database 504. In some embodiments, product session module 320 may monitor the progress of the user's involvement in the product session and maintain attributes characterizing the user's position with the product. When the end session notification is received, these attributes can be transferred from product session module 320 to product session database 504. In another embodiment, the end session notification can include the attributes characterizing the user's position with the product.

At step 830, a datacenter may receive a start session instruction to begin rendering PPP content for distribution to a second platform. At step 840, attributes may be retrieved from a database (e.g., product session database 504) in response to the received start session to enable the datacenter to resume rendering of the PPP content from a previous session. At step 850, the datacenter may begin rendering PPP content based on the retrieved attributes. At step 860, the rendered PPP content can be distributed to the second platform via a network.

The steps shown in FIG. 8 are merely illustrative, and it is understood that the order of the steps may be changed, that steps may be omitted, and other steps may be added. For example, at step 830, the datacenter may receive a start session instruction to begin rendering PPP content for distribution to the first platform. Thus, in this approach, the session may end at the first platform and be resumed at the first platform.

Figure 9:
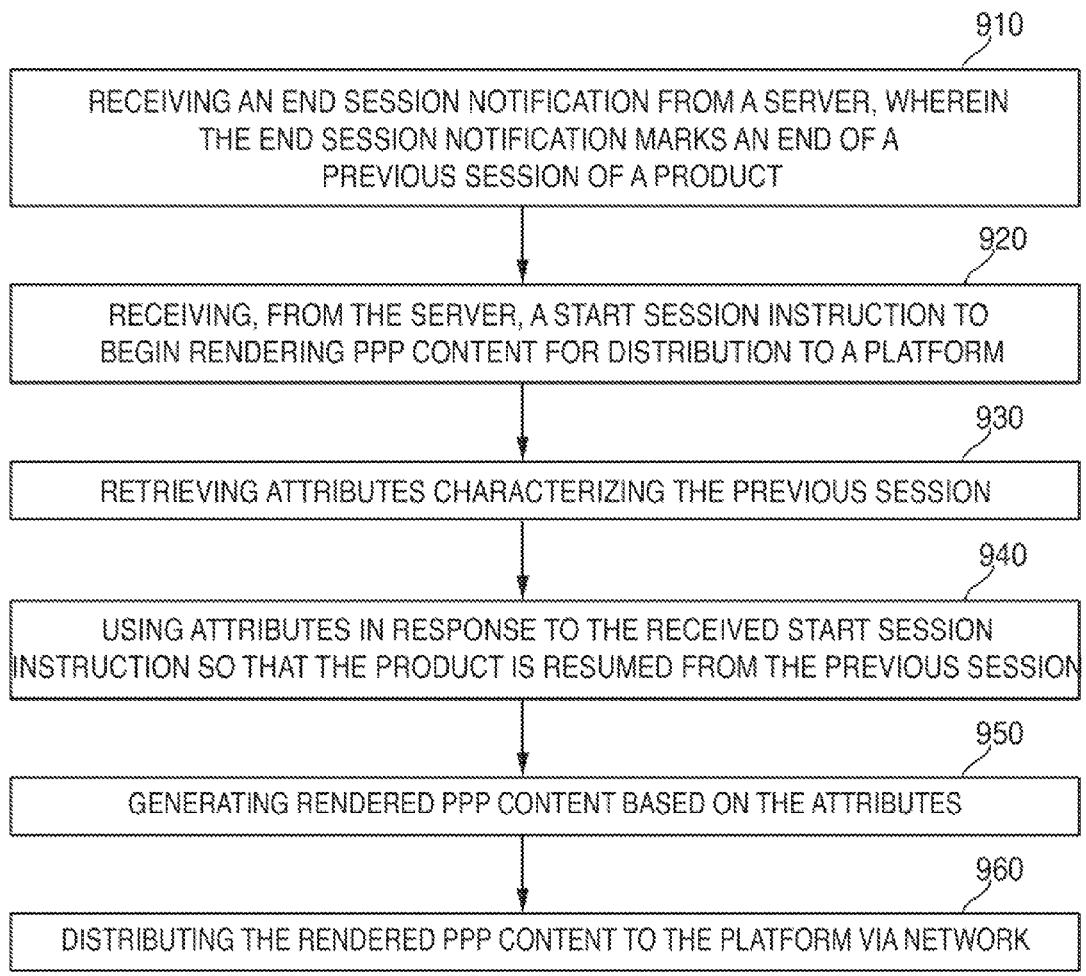
FIG. 9 shows an illustrative flowchart of steps that may be practiced by a datacenter to enable a third party service provider to provide cross platform resumption of a previously purchased product, according to an embodiment.

FIG. 9 shows an illustrative flowchart of steps that may be practiced by a datacenter to enable a third party service provider to provide cross platform resumption of a PPP according to an embodiment. The steps illustrated in FIG. 9 illustrate how a third party service, such as that managed by server 220 or 222, can provide cloud saves for its customers. Beginning with step 910, an end session notification can be received from a server. For example, the user may be using platform 610 when he decides to stop playing. When the user stops play, the server program running on that platform may communicate this desire with the server program running on the server.

At step 920, a datacenter may receive a start session instruction to begin rendering PPP content for distribution to a second platform. The start session instruction may be transmitted by the server. At step 930, attributes characterizing the user's position within the product can be received from the server (e.g., stored at database 422). In some embodiments, product session module 416 may monitor the progress of the user's involvement in the product session and maintain attributes characterizing the user's position with the product. In other embodiments, product session module 320 may monitor the progress of the user's involvement in the product session and maintain attributes characterizing the user's position with the product. At step 940, attributes may be used in response to the received start session to enable the datacenter to resume rendering of the PPP content from a previous session. At step 950, the datacenter may begin rendering PPP content based on the retrieved attributes. At step 960, the rendered PPP content can be distributed to the second platform via a network.

The steps shown in FIG. 9 are merely illustrative, and it is understood that the order of the steps may be changed, that steps may be omitted, and other steps may be added.

Figure 10:
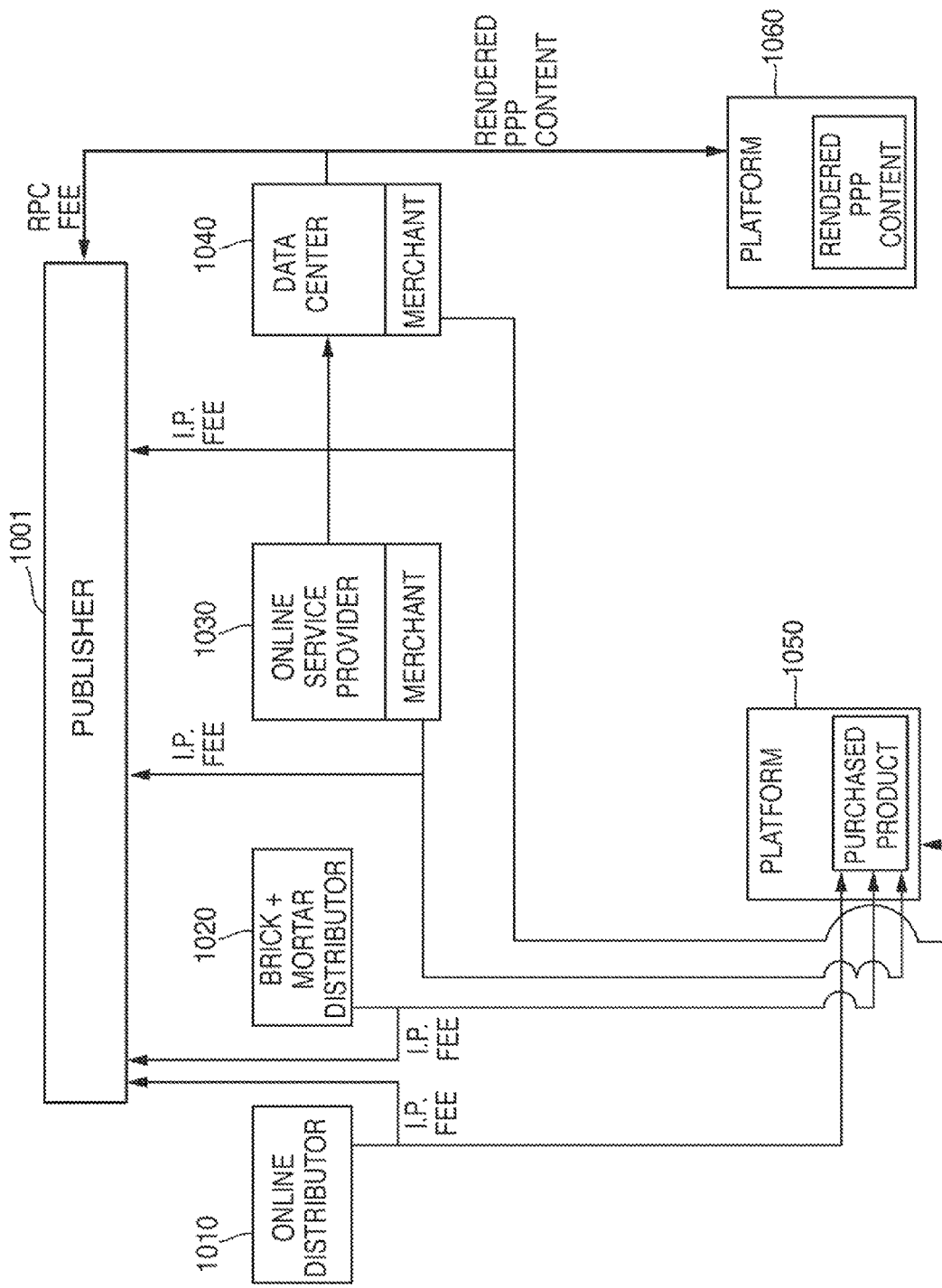
FIG. 10 shows an illustrative diagram of how fees may be provided to a publisher according to various embodiments.

FIG. 10 shows an illustrative diagram of how fees may be provided to a publisher according to various embodiments. In particular, FIG. 10 shows how fees are provided to a publisher when an product is initially purchased and when that purchased product is provided as rendered PPP content. FIG. 10 shows publisher 1001, online distributor 1010, brick and mortar distributor 1020, online service provider 1030, datacenter 1040, and platforms 1050 and 1060. When a user purchases an product from one of online distributor 1010, brick and mortar distributor 1020, online service provider 1030, and datacenter 1040, publisher 1001 may receive an initial purchase fee (shown as I.P. Fee in the FIG.). When the product is purchased, the user can install or use it in connection with platform 1050. The I.P. Fee satisfies publisher 1001's desire to be compensated for the purchased products originally intended use on platform 1050.

The various PPP rendering embodiments discussed herein, however, enable the PPP to be provided as rendered PPP content for use on a platform other than platform 1050, such as platform 1060. Publisher 1001 may also receive a rendered PPP content fee (shown as RPC Fee in the FIG.) when datacenter 1040 distributes the rendered PPP content. The RPC Fee may be provided by datacenter 1040. Any suitable fee arrangement may be used to adequately compensate publisher 1001. For example, the fee may be based on a user subscription, per product, or per each rendering occurrence.

A One or more Application Programming Interfaces ("APIs") may be used in some embodiments (e.g., with respect to datacenter 210, server 220, and server 222). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in pan by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Figure 11:
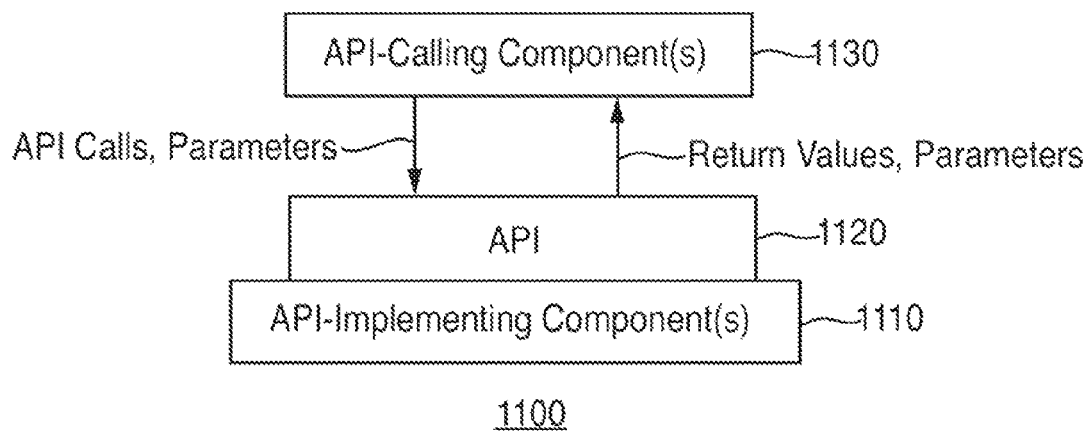
FIG. 11 is a block diagram illustrating an exemplary API architecture, which may be used in some embodiments.

FIG. 11 is a block diagram illustrating an exemplary API architecture 1100, which may be used in some embodiments of the invention. As shown in FIG. 11, the API architecture 1100 may include an API-implementing component 1110 (e.g., an operating system, a library, a device driver, an API, an application program, software, or other module) that may implements an API 1120. API 1120 may specify one or more functions, methods, classes, objects, protocols, data structures, formats, and/or other features of API-implementing component 1110 that may be used by an API-calling component 1130. API 1120 can specify at least one calling convention that may specify how a function in API-implementing component 1110 may receive parameters from API-calling component 1130 and how the function may return a result to API-calling component 1130. API-calling component 1130 (e.g., an operating system, a library, a device driver, an API, an application program, software, or other module), may make API calls through API 1120 to access and use the features of API-implementing component 1110 that may be specified by API 1120. API-implementing component 1110 may return a value through API 1120 to API-calling component 1130 in response to an API call.

It is to be appreciated that API-implementing component 1110 may include additional functions, methods, classes, data structures, and/or other features that may not be specified through API 1120 and that may not be available to API-calling component 1130. It is to be understood that API-calling component 1130 may be on the same system as API-implementing component 1110 or may be located remotely and may access API-implementing component 1110 using API 1120 over a network. While FIG. 11 illustrates a single API-calling component 1130 interacting with API 1120, it is to be understood that other API-calling components, which may be written in different languages than, or the same language as, API-calling component 1130, may use API 1120.

API-implementing component 1110, API 1120, and API-calling component 1130 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 12:
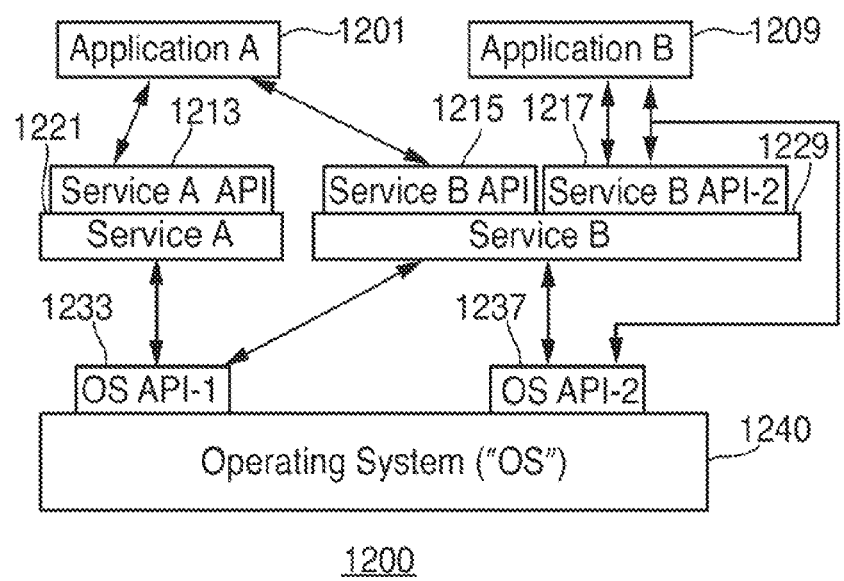
FIG. 12 is a block diagram illustrating an exemplary software stack, which may be used in some embodiments.

FIG. 12 is a block diagram illustrating an exemplary software stack 1200, which may be used in some embodiments of the invention. As shown in FIG. 12, Application A 1201 and Application B 1209 can make calls to Service A 1221 or Service B 1229 using several Service APIs (e.g., Service APIs 1213, 1215, and 1217) and to Operating System ("OS") 1240 using several OS APIs (e.g., OS APIs 1233 and 1237). Service A 1221 and Service B 1229 can make calls to OS 1240 using several OS APIs (e.g., OS APIs 1233 and 1237).

For example, as shown in FIG. 12, Service B 1229 may include two APIs, one of which (i.e., Service B API-1 1215) may receive calls from and return values to Application A 1201 and the other of which (i.e., Service B API-2 1217) may receive calls from and return values to Application B 1209. Service A 1221, which can be, for example, a software library, may make calls to and receive returned values from OS API-1 1233, and Service B 1229, which can be, for example, a software library, may make calls to and receive returned values from both OS API-1 1233 and OS API-2 1237. Application B 1209 may make calls to and receive returned values from OS API-2 1237.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc.). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A datacenter for providing cross platform access to previously purchased products (PPPs), comprising:
   an product library comprising code for each of a plurality of previously purchased products;
   a translation library comprising a plurality of translation maps for mapping inputs received from one platform to translated inputs for use in another platform for any one of the PPPs;
   a translation module operative to use one of the translation maps to map received inputs to translated inputs;
   rendering module operative to generate rendered PPP content based on product code retrieved from the product library and translated inputs received from the translation module; and
   circuitry operative to transmit the rendered PPP content to a platform via a network;
   wherein the rendered PPP content is based on product code of a PPP designed to be locally rendered by a first platform, wherein the first platform comprises a first user input interface, and wherein the rendered PPP content is transmitted to the platform that is a second platform that is not able to locally render the product code of the PPP designed to be locally rendered by the first platform, wherein the second platform comprises a second user input interface that generates the received inputs in response to user interaction, and wherein the translated inputs correspond to inputs that would be generated by first user input interface in response to the same user interaction.

2. The datacenter of claim 1, further comprising an product session module operative to monitor attributes of an active product session.

3. The datacenter of claim 2, further comprising a database, wherein the monitored attributes are stored in the database.

4. The datacenter of claim 2, further comprising transmitting the monitored attributes to a server that provides users associated with the sever access to PPP rendering services provided by the database.

5. The datacenter of claim 2, wherein the product session module is operative to enable resumption a previous product session.

6. The datacenter of claim 1, further comprising a network monitoring module operative to:
   monitor characteristics of a network connection existing between the database and a platform receiving the rendered PPP content;
   wherein the monitored characteristics are used to dynamically adjust a bit rate of the rendered PPP content.

7. The database of claim 1, wherein the PPPs are video games.

8. The database of claim 1, wherein the platform is operative to function as a thin client.

9. The database of claim 1, further comprising an account management database operative to keep track of PPPs associated with each user account.

10. The database of claim 1, further comprising a server interaction module operative to communicate with a server that provides users associated with the server access to PPP rendering services provided by the datacenter.

11. The database of claim 10, wherein the server interaction module is operative to receive requests from the server to transmit the rendered PPP content to the platform, wherein the platform is associated with a user having an account with the server.

12. The database of claim 11, wherein the request comprises attributes characterizing the user position with the PPP, wherein the attributes enable the rendering module to resume an product session from a previous product session.

13. A method for providing cross-platform gaming services, comprising:
   receiving an indication that an product has been previously purchased, wherein the previously purchased product (PPP) comprises code and is designed to be locally rendered on a first platform;
   receiving an instruction to transmit rendered PPP content to a second platform;
   processing the code to generate the rendered PPP content in response to the received instruction to distribute the PPP; and transmitting the rendered PPP content to the second platform;
receiving input commands from the second platform;
translating the received input commands into translated input commands; and
using the translated input commands when generating the rendered PPP content;
wherein the rendered PPP content is based on product code of a PPP designed to be locally rendered by the first platform, wherein the first platform comprises a first user input interface, and wherein the rendered PPP content is transmitted to the second platform that is not able to locally render the product code of the PPP designed to be locally rendered by the first platform, wherein the second platform comprises a second user input interface that generates the received input commands in response to user interaction, and wherein the translated input commands correspond to inputs that would be generated by first user input interface in response to the same user interaction.

14. The method of claim 13, wherein the PPP is a video game.

15. The method of claim 13, further comprising:
monitoring characteristics of a network connection with the second platform; and
dynamically adjusting a bit rate of the rendered PPP content being transmitted to the second platform based on the monitored characteristics of the network connection.

16. The method of claim 13, further comprising:
providing a fee to a publisher of the PPP for use in generating the rendered PPP content for transmission to the second platform.

* * * * *